US011781672B1

(12) United States Patent
Murray

(10) Patent No.: US 11,781,672 B1
(45) Date of Patent: Oct. 10, 2023

(54) VALVE ASSEMBLY

(71) Applicant: ROLLS-ROYCE plc, London (GB)

(72) Inventor: Christopher A. Murray, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/058,459

(22) Filed: Nov. 23, 2022

(30) Foreign Application Priority Data

Nov. 29, 2021 (GB) ..................................... 2117158

(51) Int. Cl.
| | | |
|---|---|---|
| *F16K 31/126* | (2006.01) | |
| *F16K 1/12* | (2006.01) | |
| *F16K 17/04* | (2006.01) | |
| *F02C 7/28* | (2006.01) | |
| *F02C 6/08* | (2006.01) | |
| *F04D 27/02* | (2006.01) | |

(52) U.S. Cl.
CPC ............ *F16K 31/126* (2013.01); *F16K 1/123* (2013.01); *F16K 31/1266* (2013.01); *F02C 6/08* (2013.01); *F02C 7/28* (2013.01); *F04D 27/0215* (2013.01); *F05D 2260/606* (2013.01); *F05D 2270/65* (2013.01); *F16K 17/0493* (2013.01)

(58) Field of Classification Search
CPC ........ F16K 1/1266; F16K 1/123; F16K 1/126; F02C 6/08; F04D 27/0215; F05D 2260/606; F05D 2270/65
See application file for complete search history.

(56) References Cited

U.S. PATENT DOCUMENTS 1,465,401 A * 8/1923 Losel .................. F04D 27/0215
  415/55.1
1,585,732 A * 5/1926 Otto ...................... F16K 31/126
  251/61.4
(Continued)

FOREIGN PATENT DOCUMENTS

CN 201277378 Y 7/2009
DE 1775332 A1 5/1971
(Continued)

OTHER PUBLICATIONS

Apr. 18, 2023 extended Search Report issued in European Patent Application No. 22204607.0.

*Primary Examiner* — Umashankar Venkatesan
(74) *Attorney, Agent, or Firm* — Oliff PLC

(57) ABSTRACT

A valve assembly includes a fluid flow passage, a valve seat, and an actuator assembly. The actuator assembly includes an actuator body stationary relative to the valve seat and a valve member moveable relative to the valve seat between a first position in which the valve member engages the valve seat, and a second position in which the valve member is remote from the valve seat. The valve member includes at least one orifice extending therethrough. The actuator assembly further includes a bellows attached to the valve member and to the actuator body. An interior surface of the bellows, the actuator body, and the valve member define a control chamber therebetween. An exterior surface of the bellows and the valve member define an outer volume therebetween such that the outer volume is around the control chamber. The at least one orifice fluidly communicates the control chamber with the outer volume.

20 Claims, 9 Drawing Sheets

(56) References Cited

U.S. PATENT DOCUMENTS

| | | | | |
|---|---|---|---|---|
| 2,698,568 A * | 1/1955 | Jensen | | G05D 16/106 |
| | | | | 137/81.1 |
| 3,087,511 A * | 4/1963 | Abild | | F02K 9/58 |
| | | | | 137/628 |
| 3,204,969 A | 9/1965 | Williams | | |
| 3,235,270 A | 2/1966 | Williams et al. | | |
| 3,432,139 A | 3/1969 | Jentoft | | |
| 3,807,511 A | 4/1974 | Oliver | | |
| 4,057,360 A | 11/1977 | Theis, Jr. et al. | | |
| 5,033,505 A * | 7/1991 | Eidsmore | | F16K 31/086 |
| | | | | 137/906 |
| 7,055,542 B2 * | 6/2006 | Delobel | | F16K 41/103 |
| | | | | 137/219 |
| 7,159,839 B2 | 1/2007 | Tanikawa et al. | | |
| 8,808,071 B2 * | 8/2014 | Bracker | | F16K 31/126 |
| | | | | 454/72 |
| 8,910,653 B2 * | 12/2014 | McAuliffe | | F16K 31/1223 |
| | | | | 137/220 |
| 10,378,654 B2 * | 8/2019 | Villanueva | | G05D 16/2097 |
| 10,436,346 B1 * | 10/2019 | Rowe | | F16K 31/122 |
| 10,738,712 B2 * | 8/2020 | Widener | | F01D 9/023 |
| 10,823,308 B1 * | 11/2020 | DeFelice | | F16K 31/50 |
| 10,941,551 B2 * | 3/2021 | Arndt | | E03D 1/14 |
| 11,125,353 B2 * | 9/2021 | Le | | F16K 11/022 |
| 11,215,295 B2 * | 1/2022 | Murray | | F16K 31/0631 |
| 11,313,284 B2 * | 4/2022 | Romano | | F16K 1/123 |
| 2004/0129310 A1 | 7/2004 | Delobel et al. | | |
| 2006/0064982 A1 | 3/2006 | Mitten | | |
| 2012/0286178 A1 | 11/2012 | Kanzaka | | |
| 2015/0104341 A1 * | 4/2015 | Ruh | | F02B 37/162 |
| | | | | 417/440 |
| 2017/0356348 A1 * | 12/2017 | Ribarov | | F04D 27/023 |
| 2018/0216539 A1 | 8/2018 | Widener et al. | | |
| 2020/0109795 A1 | 4/2020 | Murray | | |
| 2020/0109796 A1 | 4/2020 | Murray | | |

FOREIGN PATENT DOCUMENTS

| | | |
|---|---|---|
| DE | 3938905 A1 | 5/1991 |
| EP | 3636971 A1 | 11/2019 |
| EP | 3636896 A1 | 4/2020 |
| FR | 1088872 A | 3/1955 |
| GB | 636115 A | 4/1950 |
| GB | 1312182 A | 4/1973 |
| KR | 20070030612 A1 | 3/2007 |
| KR | 101507461 B1 | 4/2015 |
| WO | 2013101795 A1 | 7/2013 |

* cited by examiner

VALVE ASSEMBLY

CROSS-REFERENCE TO RELATED APPLICATIONS

This specification is based upon and claims the benefit of priority from the United Kingdom patent application number GB 2117158.2 filed on Nov. 29 2021, the entire contents of which are incorporated herein by reference.

BACKGROUND

Field of the Disclosure

The present disclosure generally relates to a valve assembly, and in particular to a valve assembly for a gas turbine engine.

Description of the Related Art

Valve assemblies are used in various applications including gas turbine engines. Some valve assemblies may define a flow path or flow passage between moving components. The two moving components may require sealing (i.e., a dynamic seal) which may be provided by a moveable valve member. The performance of such seals may typically be affected by operational factors, such as, swelling due to presence of fluids, surface roughness of mating or engaging surfaces, lubrication, internal pressure, compression, elasticity, humidity, oxidation (e.g., at elevated temperatures), exudation (e.g., at elevated temperatures and/or humidity), and friction between moving components.

Seals have been developed to withstand one or more of the abovementioned operational factors. However, use of such seals may be limited by thermal and environmental limits of the seals themselves, while some seals that have an increased ability to withstand high temperatures may increase friction between the moveable components, and thereby cause, or increase, leakage (e.g., from a control chamber of the valve or through the valve assembly when the valve assembly is supposed to be closed). These seals may therefore be susceptible to a parasitic leakage flow which may draw fluid into a control system of the valve assembly, e.g., when the dynamic seal is used to seal the control chamber of the valve. The leakage increases over time requiring replacement of such seals, which is inconvenient and expensive.

United States patent application US 2020/0109795 A1 discloses a valve assembly that includes a valve seat, an actuator assembly, and a fluid flow passage to permit flow of a fluid through the valve assembly. The actuator assembly includes a metal bellows that is attached to a valve member and to an actuator body and is disposed within the fluid flow passage. The valve member is moveable relative to the actuator body and extends around the actuator body. The actuator body, the metal bellows, and the valve member define a control chamber therebetween. Although the valve assembly provides improved leak-resistance and/or effective service life, especially when used at high temperatures, however, the metal bellows is subjected to unbalanced forces (i.e., lateral distortion) due to difference in a fluid pressure between inside of the control chamber and outside of the metal bellows. This pressure difference may impact a cyclic life of the bellows.

SUMMARY

According to a first aspect there is provided a valve assembly. The valve assembly includes a fluid flow passage to permit a flow of a fluid through the valve assembly. The valve assembly further includes a valve seat and an actuator assembly. The actuator assembly includes an actuator body in a fixed position relative to the valve seat. The actuator assembly further includes a valve member moveable relative to the valve seat between a first position in which the valve member is at least partially engaged with the valve seat to at least partially block the fluid flow passage, and a second position in which the valve member is remote from the valve seat. The valve member is moveable relative to the actuator body and extends around the actuator body such that the actuator body is disposed within the valve member. The valve member includes at least one orifice extending therethrough. The actuator assembly further includes a bellows received within the valve member, and attached to the valve member and to the actuator body. The bellows includes an interior surface and an exterior surface opposite to the interior surface. The interior surface of the bellows, the actuator body, and the valve member define a control chamber therebetween. The exterior surface of the bellows and the valve member define an outer volume therebetween such that the outer volume is around the control chamber. The at least one orifice fluidly communicates the control chamber with the outer volume.

The at least one orifice may allow flow of a fluid between the control chamber and the outer volume, and therefore, allow a pressure inside the control chamber to be balanced with a pressure outside the control chamber (i.e., the outer volume) when the valve member is in the second position and away from the valve seat. This may significantly reduce or eliminate any unbalanced forces on the valve member, and therefore, avoid lateral distortion of the valve member. Further, this pressure balance may increase a cyclic life (or a service life) of the valve member across the operational cycles of the valve assembly. Additionally, this may further reduce a total life cycle cost of the valve assembly.

In some embodiments, the valve member includes a first valve member portion proximate the valve seat and a second valve member portion remote from the valve seat. The actuator body comprises a first actuator side and a second actuator side opposite to the first actuator side. The first actuator side faces the first valve member portion and the second actuator side faces the second valve member portion. The bellows is attached to the second actuator side of the actuator body and to the second valve member portion, the bellows thereby being disposed between the actuator body and the second valve member portion.

The bellows may provide a required seal through the valve assembly whilst fulfilling thermal capability requirements of the valve assembly. A sliding seal need not be required, and therefore, the control chamber may be less susceptible to leakage and wear that are associated with such sliding seals. This, in turn, may increase a service life of the valve assembly. The valve assembly may, accordingly, also exhibit reduced friction and stiction loads.

As the sliding seal need not be required, the bellows may reduce parasitic leakage flow through the valve assembly, particularly when the bellows is welded to the actuator body and to the valve member. The valve assembly, may therefore, have a quicker response time due to reduction of pressure losses through leakage in the valve assembly.

As the bellows is attached (e.g., mechanically connected) to both the second actuator side of the actuator body and to the second valve member portion, rotational movement of the valve member is constrained and/or restricted with respect to the actuator body. For example, the valve member may be rotationally constrained by virtue of its attachment to the actuator body and to the bellows. This may, in turn, reduce a propensity for mechanical damage to these components.

In some embodiments, the first valve member portion is around the actuator body and at least partially engages the valve seat in the first position of the valve member. The engagement between the first valve portion and the valve seat in the first position of the valve member may block fluid flow through the valve assembly.

In some embodiments, the actuator body further includes a guide shaft configured to guide a movement of the valve member. The second valve member portion is slidably engaged with the guide shaft. Thus, the guide shaft may facilitate movement of the valve member between the first position and the second position in a robust manner.

In some embodiments, the second valve member portion further includes a tubular section at least partially and slidingly receiving the guide shaft therein. The tubular section may slidably engage with the guide shaft to facilitate movement of the second valve member portion, and the valve member, between the first position and the second position.

In some embodiments, the interior surface of the bellows, the actuator body, and the second valve member portion define the control chamber therebetween.

In some embodiments, the exterior surface of the bellows and the first valve member portion define the outer volume therebetween. Therefore, the bellows may separate the control chamber from the outer volume.

In some embodiments, the second valve member portion includes the at least one orifice. Thus, the at least one orifice fluidly communicates the control chamber with the outer volume through the second valve member portion.

In some embodiments, the valve member is configured to move toward its first position when a pressure outside of the actuator assembly at the second valve member portion is greater than a pressure inside of the control chamber.

In some embodiments, the valve member is configured to move toward its second position when the pressure outside of the actuator assembly at the second valve member portion is less than or equal to the pressure inside of the control chamber.

Therefore, the valve member may move in response to a differential pressure across the valve member. The valve member (and therefore, the valve assembly) may be held in any position (including, but not limited to, a fully open and a fully closed position) by controlling the pressure inside the control chamber (e.g., via a control system). In some embodiments, the bellows may allow fully variable control (e.g., positioning) of the valve member with respect to the actuator body.

In some embodiments, the valve member includes a first end facing the valve seat and a second end opposite to the first end. The at least one orifice is disposed proximal to the second end. Such a position of the at least one orifice may facilitate fluid flow between the control chamber and the outer volume.

In some embodiments, the at least one orifice includes a first orifice portion disposed in fluid communication with the control chamber, and a second orifice portion inclined to the first orifice portion and disposed in fluid communication with the outer volume. Such a configuration of the at least one orifice may facilitate fluid flow between the control chamber and the outer volume.

In some embodiments, the first orifice portion has a first average width and the second orifice portion has a second average width. The first average width is less than the second average width. This may allow metering of fluid flow through the at least one orifice. Further, such a configuration of the at least one orifice may facilitate fluid flow between the control chamber and the outer volume.

In some embodiments, the first orifice portion has a first length and the second orifice portion has a second length. The second length is greater than the first length by a factor of at least five. The first length and the second length may be based on a design of the valve member.

In some embodiments, the first orifice portion is disposed in direct fluid communication with the second orifice portion. This may facilitate fluid flow between the first orifice portion and the second orifice portion. Further, the first orifice portion may receive fluid from the control chamber and second orifice portion may receive the fluid from the first orifice portion. The second orifice portion may allow flow of the fluid received from the first orifice portion to the outer volume.

In some embodiments, the first orifice portion is perpendicular to the second orifice portion. Such a configuration may be based on manufacturing and design requirements.

In some embodiments, the at least one orifice further includes an adjustable orifice area portion fluidly disposed between the first orifice portion and the second orifice portion. The actuator assembly further includes an adjustable plug movably coupled to the valve member adjacent to the adjustable orifice area portion. The adjustable plug is configured to selectively adjust a cross sectional area of the adjustable orifice area portion. Thus, the adjustable plug may control a fluid flow through the at least one orifice based on a position of the adjustable plug with respect to the adjustable orifice area portion.

In some embodiments, the at least one orifice includes a plurality of orifices angularly separated from each other with respect to a longitudinal axis of the valve assembly. The plurality of orifices may facilitate pressure equalization between the control chamber and the outer volume.

In some embodiments, the valve member further includes an open valve stop that is configured to engage with the actuator body to limit movement of the valve member in a direction away from the valve seat.

A maximum distance of the valve member away from the valve seat may therefore be controlled through the open valve stop. This, in turn, may control and limit a maximum amount of fluid that is able to flow through the valve assembly when the valve assembly is in a fully open configuration.

In some embodiments, in the second position of the valve member, the open valve stop sealingly engages with the actuator body to seal the outer volume. The at least one orifice is configured to at least partially reduce any pressure difference between the control chamber and the outer volume upon sealing engagement between the open valve stop and the actuator body. Thus, the control chamber and the outer volume may be pressure balanced in the second position of the valve member. Further, the valve assembly may be extremely tolerant to contamination due to the absence of flow (e.g., due to the pressure balance) through the at least one orifice in the second position of the valve member.

In some embodiments, the valve member further includes a closed valve stop configured to sealingly engage with the valve seat in the first position of the valve member. The engagement between the closed valve stop and the valve seat in the first position of the valve member may block fluid flow through the valve assembly.

In some embodiments, the bellows is moveable between an expanded configuration in which the bellows has a first dimension and a contracted configuration in which the bellows has a second dimension. The second dimension is smaller than the first dimension. When moving to its expanded configuration, the bellows is configured to move the valve member to its second position and, when moving to its contracted configuration, the bellows is configured to move the valve member to its first position. The bellows may allow fully variable control (e.g., positioning) of the valve member with respect to the actuator body.

In some embodiments, the bellows is biased toward its expanded configuration. Therefore, the valve assembly may be biased towards an open configuration. The bias (e.g., spring constant) of the bellows may therefore be to bias the valve member towards the second position of the valve member. Thus, a separate component to achieve this bias (e.g., a spring) may not be required.

In some embodiments, the valve assembly further includes at least one control chamber flow passage fluidly separate from the fluid flow passage and disposed in fluid communication with the control chamber. The at least one control chamber flow passage is configured to permit a flow of a fluid to the control chamber. The at least one control chamber flow passage may allow flow of pressurized fluid into the control chamber. Thus, an internal pressure of the control chamber may act along with the bias of the bellows to provide an opening force causing the valve member to move towards the second position away from the valve seat, thereby opening the valve assembly. The control chamber may also be vented through the control chamber flow passage causing the valve member to move towards the first position and to engage with the valve seat, thereby closing the valve assembly.

In some embodiments, a total cross sectional area of the at least one orifice is less than a total cross sectional area of the at least one control chamber flow passage. This may allow increase of pressure inside the control chamber as fluid flows into the control chamber through the control chamber flow passage, and not all fluid entering through the control chamber flow passage shall pass through the at least one orifice to the outer volume as the valve member moves away from the valve seat. Thus, fluid flow through the at least one orifice may not interfere with an actuation of the valve member.

In some embodiments, a housing member includes the fluid flow passage, the valve seat, and the at least one control chamber flow passage. The housing member further includes at least one extending portion extending with respect to the valve seat and fixedly coupled to the actuator body. The at least one extending portion at least partially defines the at least one control chamber flow passage. Thus, the at least one control chamber flow passage may be fluidly separate from the fluid flow passage of the valve assembly.

In some embodiments, the actuator body further includes at least one actuator flow passage fluidly communicating the at least one control chamber flow passage with the control chamber. Thus, the at least one control chamber flow passage may be fluidly separate from the fluid flow passage of the valve assembly.

According to a second aspect, there is provided a gas turbine engine for an aircraft. The gas turbine engine includes an engine core comprising a turbine, a compressor, and a core shaft connecting the turbine to the compressor. The gas turbine engine further includes a fan located upstream of the engine core, the fan comprising a plurality of fan blades. The gas turbine engine further includes a valve assembly of the first aspect.

In some embodiments, the valve assembly is configured such that air from the compressor is configured to flow through the fluid flow passage of the valve assembly.

In some embodiments, the valve assembly is configured such that air from the compressor is configured to flow to the control chamber of the valve assembly.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example, via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example, one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example, in use) at the lowest rotational speed (for example, the first core shaft in the example above). For example, the gearbox may be arranged to be driven only by the core shaft that is configured to rotate (for example, in use) at the lowest rotational speed (for example, only be the first core shaft, and not the second core shaft, in the example above). Alternatively, the gearbox may be arranged to be driven by any one or more shafts, for example, the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example, multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example, multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
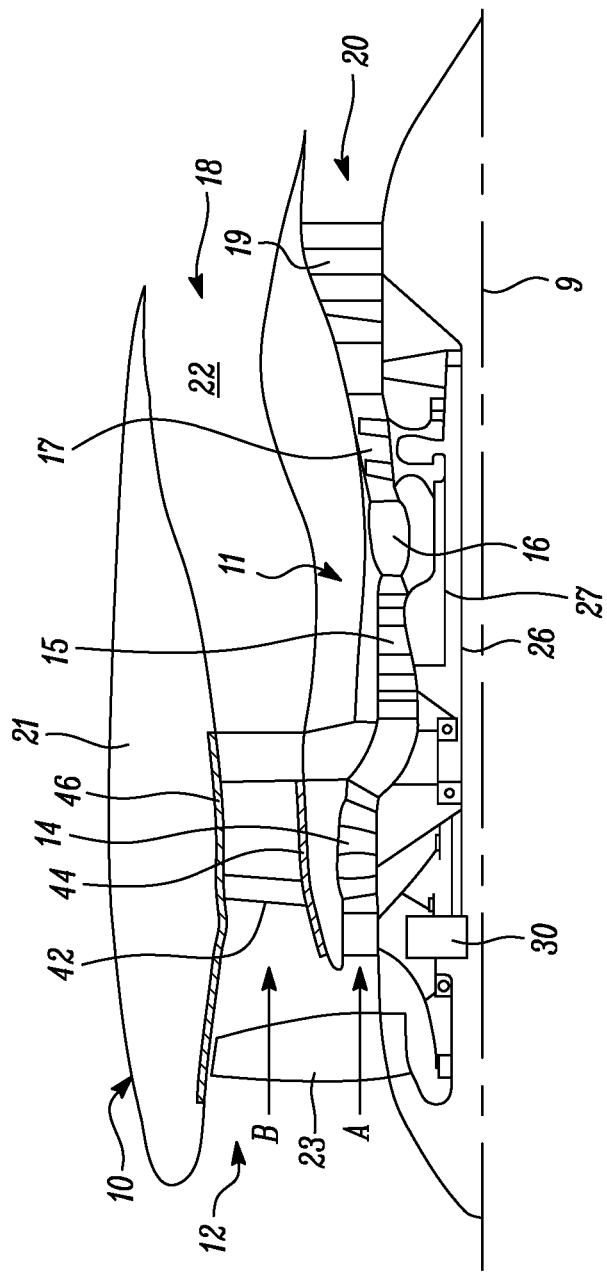
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
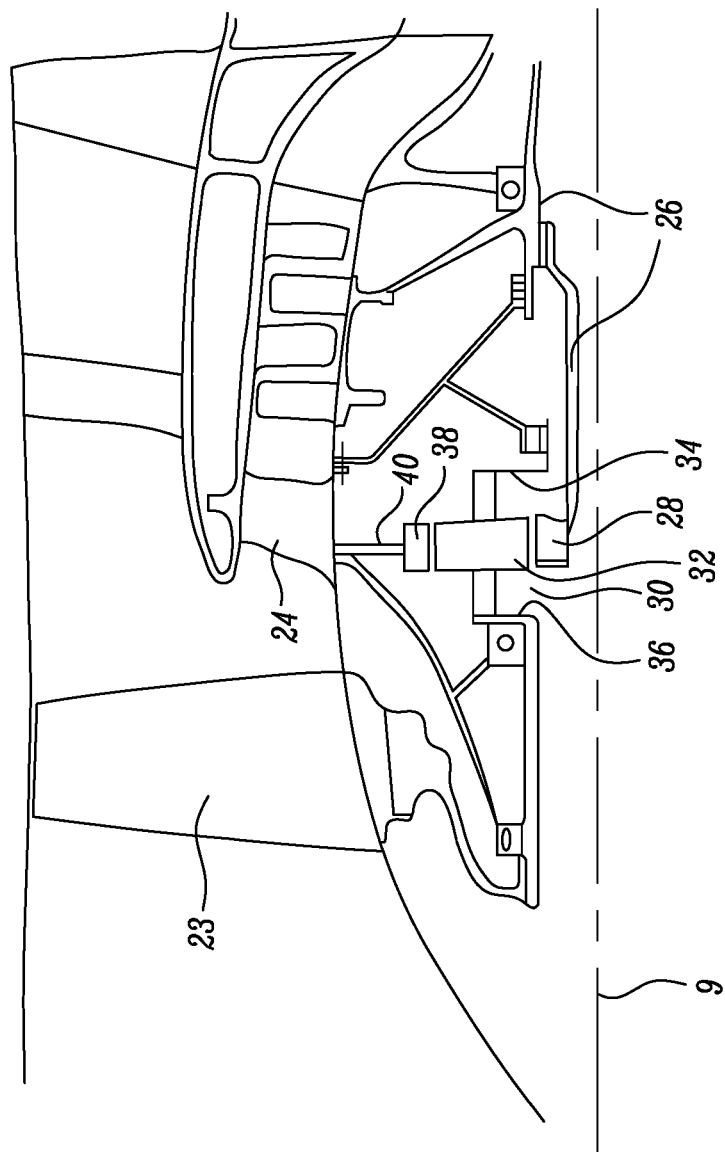
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
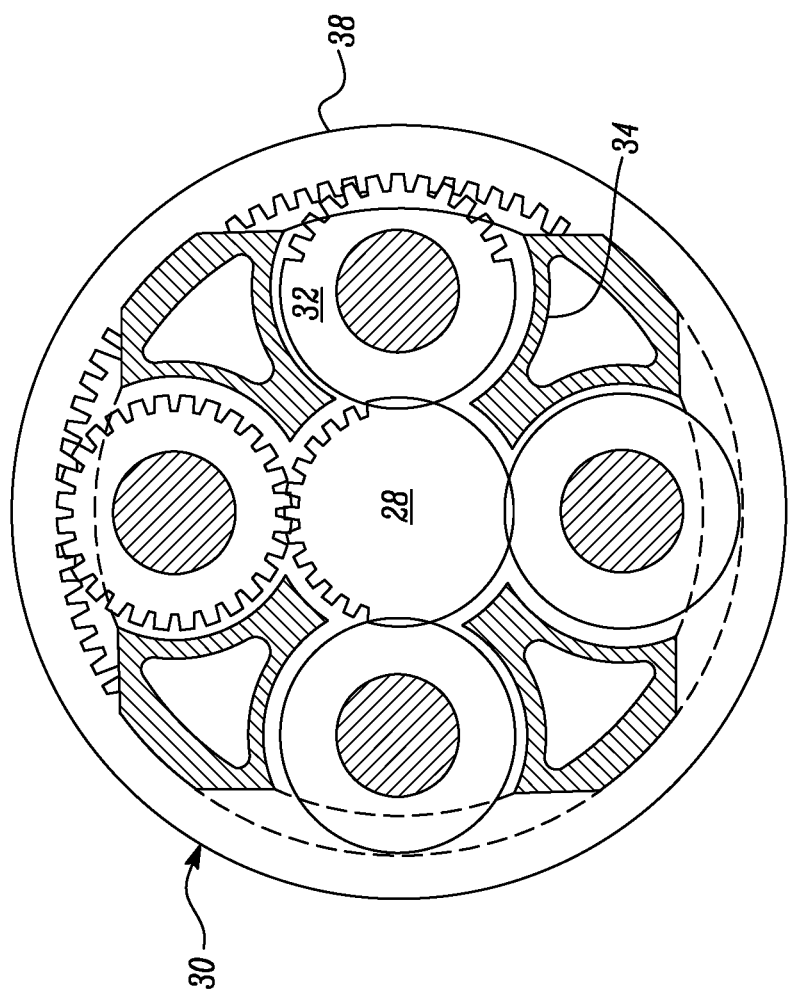
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example, between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example, star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines, and land-based gas turbine engines.

Figure 4B:
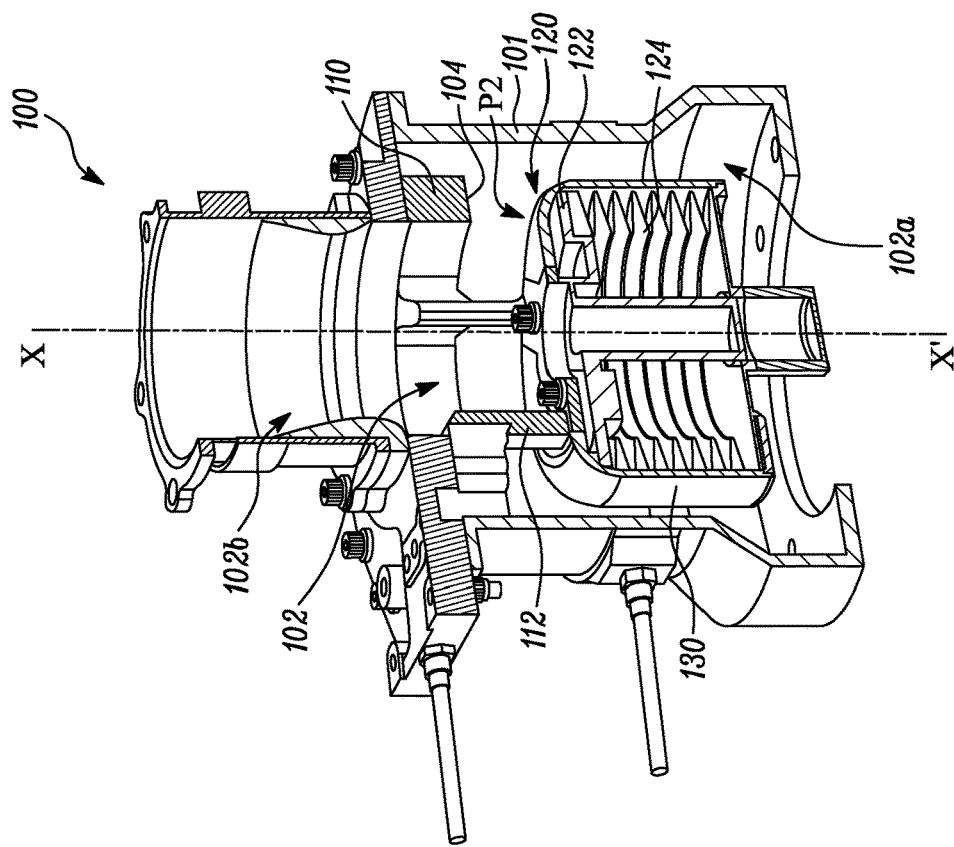
FIG. 4B is a schematic sectional view of the valve assembly taken along a plane passing through a centre of the valve assembly, according to an embodiment of the present disclosure.
Figure 4A:
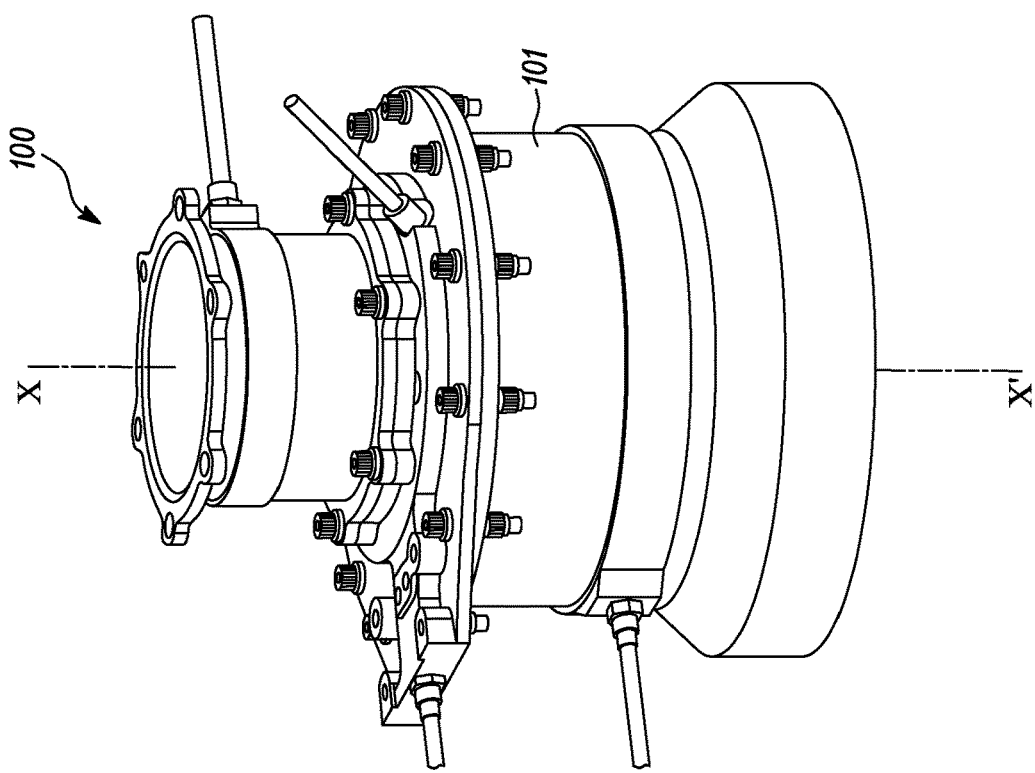
FIG. 4A is a schematic view of a valve assembly, according to an embodiment of the present disclosure.

FIG. 4A illustrates a schematic view of a valve assembly 100. In some embodiments, the gas turbine engine 10 (shown in FIG. 1) includes the valve assembly 100. The gas turbine engine 10 is interchangeably referred to hereinafter as the "engine 10". In some embodiments, the valve assembly 100 may be used to control a flow of fluid through the engine 10 (shown in FIG. 1). In some embodiments, the valve assembly 100 extends along a longitudinal axis X-X'. FIG. 4B illustrates a schematic sectional view of the valve assembly 100 taken along a plane passing through a centre of the valve assembly 100.

Referring now to FIG. 4B, the valve assembly 100 includes a fluid flow passage 102 to permit a flow of a fluid through the valve assembly 100. In some embodiments, the fluid flow passage 102 is defined within an outer housing 101 of the valve assembly 100. In some embodiments, the fluid may include air, oil, hydraulic fluid, and/or fuel, etc. In some embodiments, the fluid flow passage 102 includes an upstream portion 102a and a downstream portion 102b. It will therefore be appreciated that, when the valve assembly 100 is open, fluid is permitted to flow through the fluid flow passage 102 from the upstream portion 102a to the downstream portion 102b.

The valve assembly 100 further includes a valve seat 104 and an actuator assembly 120. The actuator assembly 120 includes an actuator body 122 in a fixed position relative to the valve seat 104. In some embodiments, the valve assembly 100 further includes a housing member 110. In some embodiments, the housing member 110 at least partially includes the fluid flow passage 102 and the valve seat 104. In some embodiments, the housing member 110 further includes at least one extending portion 112 extending with respect to the valve seat 104 and fixedly coupled to the actuator body 122. It should be understood that the housing member 110 may include any number of extending portions 112 between the valve seat 104 and the actuator body 122 based on application requirements.

The actuator assembly 120 further includes a valve member 130 moveable relative to the valve seat 104 between a first position P1 (shown in FIG. 6) in which the valve member 130 is at least partially engaged with the valve seat 104 to at least partially block the fluid flow passage 102, and a second position P2 (as shown in FIG. 4B) in which the valve member 130 is remote from the valve seat 104. Therefore, there is no relative movement between the actuator body 122 and the valve seat 104, however, the valve member 130 is able to move relative to both the valve seat 104 and the actuator body 122. It will be appreciated that the valve member 130 is moveable about the actuator body 122 to engage the valve seat 104 in order to block flow of the fluid through the fluid flow passage 102.

The second position P2 of the valve member 130 will be described with reference to FIG. 5A and the first position P1 of the valve member 130 will be described with reference to FIG. 6. It will therefore be appreciated that the valve member 130 is moveable between the configurations shown in FIGS. 5A and 6.

The valve member 130 is moveable relative to the actuator body 122 and extends around the actuator body 122 such that the actuator body 122 is disposed within the valve member 130. Therefore, the actuator body 122 is at least partially enclosed by the valve member 130. The actuator assembly 120 further includes a bellows 124 received within the valve member 130, and attached to the valve member 130 and to the actuator body 122. In some embodiments, the bellows 124 is disposed within the fluid flow passage 102 of the valve assembly 100. In some embodiments, the bellows 124 may be a metal bellows. In some embodiments, the bellows 124 is welded to the valve member 130 and/or the actuator body 122. It should be understood that the bellows 124 may be attached to the valve member 130 and/or to the actuator body 122 through any suitable attachment mechanism, for example, brazing, adhesives, fasteners, etc.

Figure 5B:
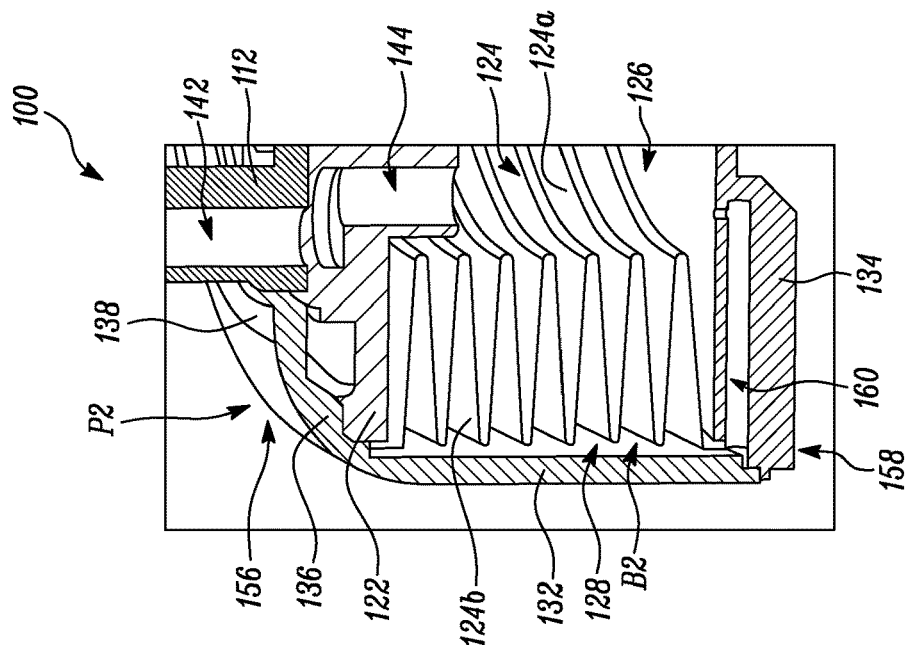
FIG. 5B is a detailed schematic sectional view of the valve assembly including an outer volume, according to an embodiment of the present disclosure.
Figure 5A:
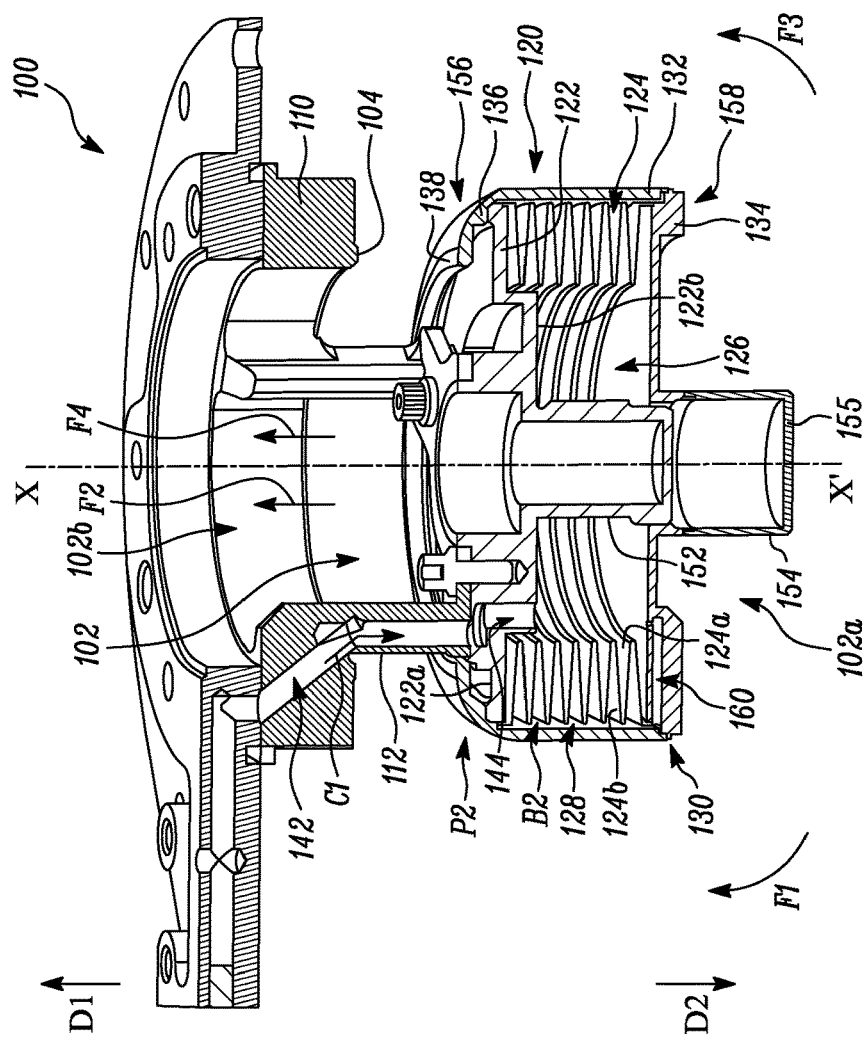
FIG. 5A is a schematic sectional view of the valve assembly taken along a plane passing through a centre of the valve assembly in a second position of a valve member, according to an embodiment of the present disclosure.
Figure 6:
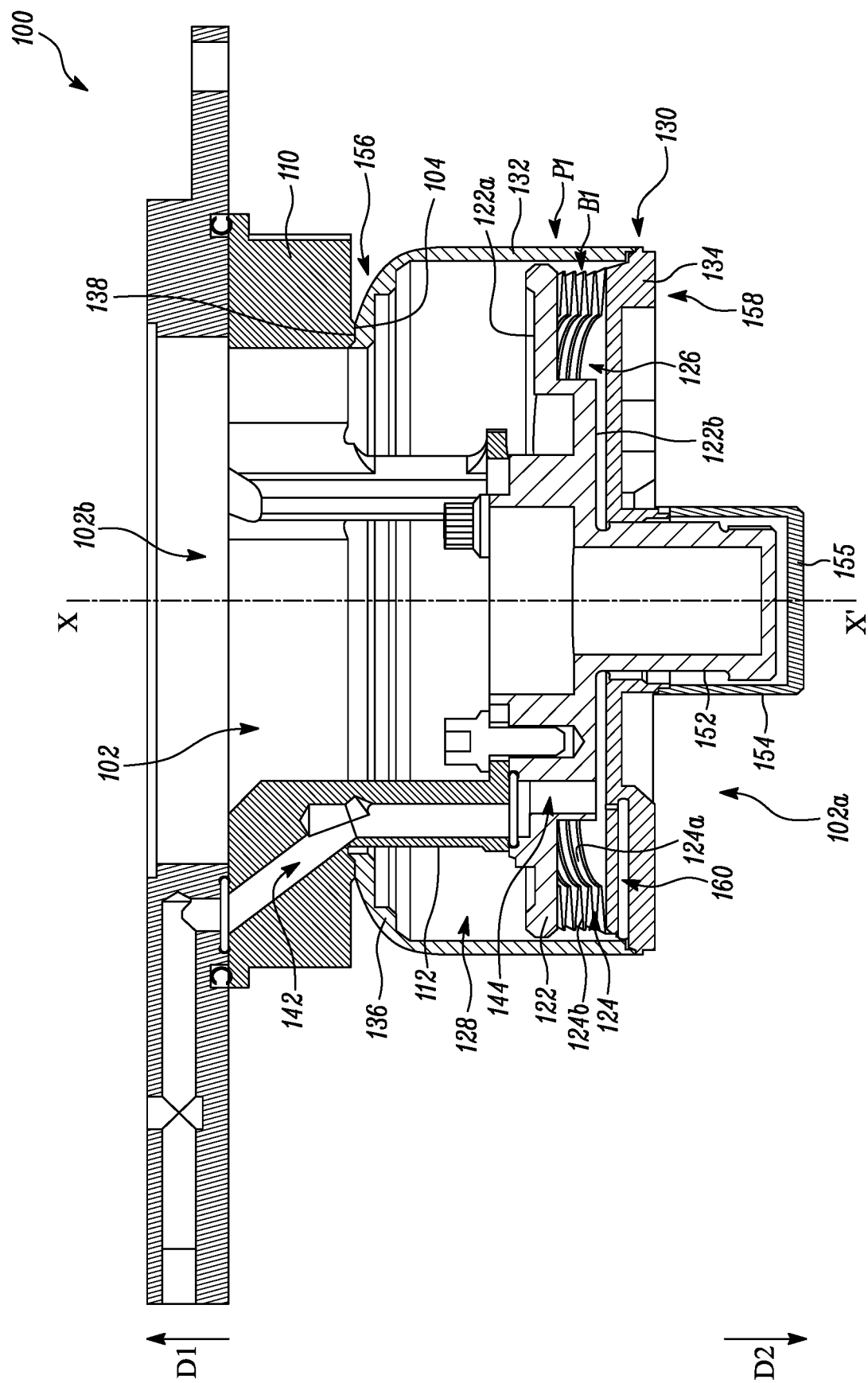
FIG. 6 is a schematic sectional view of the valve assembly taken along a plane passing through a centre of the valve assembly in a first position of the valve member, according to an embodiment of the present disclosure.

FIGS. 5A and 6 illustrate schematic sectional views of the valve assembly 100 in the second position P2 and the first position P1 of the valve member 130, respectively. Additionally, FIG. 5A illustrates the valve assembly 100 in an open configuration and FIG. 6 illustrates the valve assembly 100 in a closed configuration. Some of the parts (e.g., the outer housing 101) of the valve assembly 100 are not shown for descriptive and illustrative purposes.

In the first position P1 (shown in FIG. 6), the valve member 130 is at least partially engaged with the valve seat 104 such that flow of fluid through the fluid flow passage 102 is at least partially blocked. For example, the valve member 130 in its first position P1 may be engaged with the valve seat 104 to block the fluid flow passage 102. In the second position P2 (shown in FIG. 5A), the valve member 130 is remote from the valve seat 104 such that fluid is permitted to flow through the fluid flow passage 102 of the valve assembly 100.

In some embodiments, the second position P2 (shown in FIG. 5A) of the valve member 130 may correspond to the open configuration of the valve assembly 100 in which fluid is permitted to flow through the valve assembly 100 via the fluid flow passage 102 and the first position P1 (shown in FIG. 6) of the valve member 130 may correspond to the closed configuration of the valve assembly 100 in which fluid is restricted from flowing through the valve assembly 100 via the fluid flow passage 102. Thus, the valve assembly 100 is moveable between the open and closed configuration to selectively permit and/or restrict flow of the fluid through the valve assembly 100.

In the first position P1 (shown in FIG. 6) of the valve member 130, the valve assembly 100 is in the closed configuration (in which flow of the fluid therethrough is restricted). When the valve member 130 is not in the first position P1, the valve member 130 may be remote from the valve seat 104, thereby being in its second position P2 (shown in FIG. 5A), and flow of the fluid through the fluid flow passage 102 may be permitted since the valve member 130 is not engaged with the valve seat 104. Therefore, in the second position P2 of the valve member 130, the valve assembly 100 may be in the open configuration.

The valve member 130 is disposed within the fluid flow passage 102 and is moveable in a first direction D1 and a second direction D2. Movement of the valve member 130 in the first direction D1 is toward the first position P1 (shown in FIG. 6) of the valve member 130, in which the valve member 130 is engaged with the valve seat 104, and in which the valve assembly 100 is in the closed configuration. Movement of the valve member 130 in the second direction D2 is toward the second position P2 (shown in FIG. 5A) of the valve member 130, in which the valve member 130 is remote from the valve seat 104, and in which the valve assembly 100 is in the open configuration. Therefore, the first direction D1 is toward the downstream portion 102b of the fluid flow passage 102 and is therefore a downstream direction, and the second direction D2 is toward the upstream portion 102a of the fluid flow passage 102 and is therefore an upstream direction.

In some embodiments, the valve member 130 includes a first valve member portion 132 proximate the valve seat 104 and a second valve member portion 134 remote from the valve seat 104. Specifically, the first valve member portion 132 is a portion of the valve member 130 that is proximate the valve seat 104. Further, the first valve member portion 132 faces the valve seat 104. In some embodiments, the first valve member portion 132 is around the actuator body 122 and at least partially engages the valve seat 104 in the first position P1 (shown in FIG. 6) of the valve member 130. The second valve member portion 134 is on an opposite side of the valve member 130 and faces away from the valve seat 104. In some embodiments, the second valve member portion 134 may be in the form of a piston element.

In some embodiments, the actuator body 122 includes a first actuator side 122a and a second actuator side 122b opposite to the first actuator side 122a. The first actuator side 122a faces the first valve member portion 132 and the second actuator side 122b faces the second valve member portion 134. The bellows 124 is attached to the second actuator side 122b of the actuator body 122 and to the second valve member portion 134, the bellows 124 thereby being disposed between the actuator body 122 and the second valve member portion 134.

The bellows 124 includes an interior surface 124a and an exterior surface 124b opposite to the interior surface 124a. The interior surface 124a of the bellows 124, the actuator body 122, and the valve member 130 define a control chamber 126 therebetween. Specifically, the interior surface 124a of the bellows 124, the actuator body 122, and the second valve member portion 134 define the control chamber 126 therebetween. Therefore, the bellows 124 may provide a leakage free dynamic seal for the control chamber 126, e.g., when the bellows 124 is welded to the actuator body 122 and to the valve member 130. Further, the control chamber 126, as defined by the interior surface 124a of the bellows 124, the actuator body 122, and the second valve member portion 134, may have a variable volume based on a position of the valve member 130 with respect to the valve seat 104.

The exterior surface 124b of the bellows 124 and the valve member 130 define an outer volume 128 therebetween such that the outer volume 128 is around the control chamber 126. Specifically, the exterior surface 124b of the bellows 124 and the first valve member portion 132 define the outer volume 128 therebetween. Therefore, the outer volume 128 may surround the control chamber 126.

In some embodiments, the bellows 124 is moveable between an expanded configuration B2 (shown in FIG. 5A) in which the bellows 124 has a first dimension and a contracted configuration B1 (shown in FIG. 6) in which the bellows 124 has a second dimension. In some embodiments, the contracted configuration B1 of the bellows 124 corresponds to the first position P1 of the valve member 130 and to the closed configuration of the valve assembly 100. In some embodiments, the expanded configuration B2 of the bellows 124 corresponds to the second position P2 of the valve member 130 where the valve member 130 is away from the valve seat 104 and also corresponds to the open configuration of the valve assembly 100.

In some embodiments, the second dimension is smaller than the first dimension such that the dimension of the bellows 124 increases as the bellows 124 moves from the contracted configuration B1 (shown in FIG. 6) to the expanded configuration B2 (shown in FIG. 5A). Conversely, the dimension of the bellows 124 decreases as the bellows 124 moves from the expanded configuration B2 (shown in FIG. 5A) to the contracted configuration B1 (shown in FIG. 6). The dimension of the bellows 124 may be its height, length, depth, etc., however, the bellows 124 may have a constant width.

In some embodiments, as the bellows 124 is attached to the valve member 130 (e.g., attached to the second valve member portion 134), movement of the bellows 124 causes the valve member 130 to move relative to the actuator body 122. In some embodiments, as the actuator body 122 is in its fixed position, expansion of the bellows 124 causes the valve member 130 to move in the second direction D2 (e.g., the upstream direction) and contraction of the bellows 124 causes the valve member 130 to move in the first direction D1 (e.g., the downstream direction) and therefore towards the valve seat 104. Therefore, the bellows 124 is configured to move the valve member 130 to the second position P2 when the bellows 124 is moving towards the expanded configuration B2 and the bellows 124 is configured to move the valve member 130 to the first position P1 when the bellows 124 is moving towards the contracted configuration B1.

In some embodiments, the bellows 124 is biased toward its expanded configuration B2. Therefore, the bellows 124 may be biased in the second direction D2, e.g., biased upstream. The valve assembly 100 may therefore be biased towards the open configuration.

As will be described below, a force applied to the actuator assembly 120 in the first direction D1 may overcome the bias of the bellows 124 and cause the bellows 124 to move to the contracted configuration B1, thereby causing the valve member 130 to move in the first direction D1, towards the first position P1 (shown in FIG. 6), and therefore towards the valve seat 104. Enough force may thereby cause the valve member 130 to be fully engaged with the valve seat 104 to thereby block flow of the fluid through the fluid flow passage 102 and close the valve assembly 100. Alternatively, a force in the control chamber 126 may cause the bellows 124 to move to the expanded configuration B2 and thereby cause the valve member 130 to move in the second direction D2 to the second position P2 (shown in FIG. 5A). Therefore, when the valve member 130 is initially seated on the valve seat 104 to block the fluid flow passage 102, enough force in the control chamber 126 acting on the valve member 130 and actuator body 122 may cause the valve member 130 to become unseated, thereby opening the fluid flow passage 102 and opening the valve assembly 100.

In some embodiments, the valve member 130 is configured to move toward its first position P1 when a pressure outside of the actuator assembly 120 at the second valve member portion 134 is greater than a pressure inside of the control chamber 126. Therefore, the pressure on the upstream portion 102a of the fluid flow passage 102 may provide enough force to overcome the bias of the bellows 124 and cause the valve member 130 to move to its first position P1 (shown in FIG. 6), or seated position, thereby closing the valve assembly 100.

It will therefore be appreciated that a pressure differential across the valve member 130 may cause the valve member 130 to move between the first position P1 and the second position P2, and the bellows 124 to move between the expand configuration B2 and the contracted configuration B1. In some embodiments, a greater pressure applied to the upstream portion 102a of the fluid flow passage 102 than the pressure in the control chamber 126 may cause the bellows 124 to contract, thereby moving the valve member 130 toward the first position P1 to engage the valve seat 104.

In some embodiments, the valve member 130 is configured to move toward its second position P2 (shown in FIG. 5A) when the pressure outside of the actuator assembly 120 at the second valve member portion 134 is less than or equal to the pressure inside of the control chamber 126. Thus, the pressure inside of the control chamber 126 (along with the bias of the bellows 124) may cause the bellows 124 to expand since the pressure outside of the actuator assembly 120 at the second valve member portion 134 is less than or equal to the pressure inside of the control chamber 126, thereby moving the valve member 130 in the second direction D2 toward its second position P2, and moving the valve assembly 100 to the open configuration.

The axial expansion and contraction (or compaction) of the bellows 124 which is attached to the valve member 130 may permit the valve member 130 to translate (e.g., in the first and second directions D1, D2) as a function of differential pressures to achieve any position between the valve assembly 100 being fully open and fully closed. The translation of the valve member 130 may therefore control a flow metering, a pressure regulating, and/or a non-return function of the valve assembly 100, and therefore, may control the flow metering, pressure regulating, or non-return function of the engine 10 (shown in FIG. 1) when the valve assembly 100 is utilised in conjunction with the engine 10.

In some embodiments, the valve assembly 100 further includes at least one control chamber flow passage 142 fluidly separate from the fluid flow passage 102 and disposed in fluid communication with the control chamber 126. In some embodiments, the housing member 110 includes the at least one control chamber flow passage 142. Further, the at least one extending portion 112 at least partially defines the at least one control chamber flow passage 142. The at least one control chamber flow passage 142 is configured to permit a flow of a fluid (e.g., a pressurized fluid) to the control chamber 126. The "at least one control chamber flow passage 142" is interchangeably referred to hereinafter as the "control chamber flow passage 142". In some embodiments, the actuator body 122 further includes at least one actuator flow passage 144 fluidly communicating the at least one control chamber flow passage 142 with the control chamber 126.

It will be appreciated that as the pressurized fluid is supplied into the control chamber 126, the internal pressure may act along with the bias of the bellows 124 to provide an opening force causing the valve member 130 to move towards the second direction D2 away from the valve seat 104, thereby opening the valve assembly 100. This may overcome any closing force provided on the upstream portion 102a of the fluid flow passage 102. This force imbalance may cause the valve member 130 to move away from the valve seat 104 (in the second direction D2). When the control chamber 126 is vented (e.g., through the control chamber flow passage 142), the resulting force imbalance may cause the valve member 130 to move in the first direction D1 and to become seated (e.g., engaged with the valve seat 104), to thereby move the valve assembly 100 to the closed configuration. Therefore, control of the pressure supplied to the control chamber 126 inside of the bellows 124 may allow the valve member 130 to be controlled to any given position between the first position P1 and the second position P2. Further, the bellows 124 may provide a seal for the control chamber 126. Therefore, no sliding seal is required and leakage flow of pressurised fluid out of the control chamber 126 may be mitigated and/or prevented.

Referring now to FIG. 5A, the valve assembly 100 in shown the open configuration. In the open configuration, the valve member 130 has moved to the second position P2 thereby unblocking, or at least partially unblocking, the fluid flow passage 102. Flow of fluid is thereby permitted through the valve assembly 100 as indicated by the arrows F1-F4.

The actuator assembly 120 is disposed within the fluid flow passage 102 such that, when the valve assembly 100 is in the open configuration, fluid is configured to flow from the upstream portion 102a of the fluid flow passage 102 to the downstream portion 102b of the fluid flow passage 102 around the actuator assembly 120 (and therefore, around the valve member 130 and around the bellows 124).

As shown in FIG. 5A, the pressure acting on the actuator assembly 120 at the second valve member portion 134 at the upstream portion 102a of the fluid flow passage 102 is not enough to overcome the pressure inside the control chamber 126, thus, the bellows 124 is in the expanded configuration B2, and the valve member 130 is remote from the valve seat 104. Accordingly, FIG. 5A shows the valve assembly 100 in the open configuration.

As shown in FIG. 5A, the control chamber flow passage 142 defines a fluid path indicated by an arrow C1 into the control chamber 126. In some embodiments, a controller (not shown) may be provided and configured to supply the control chamber 126 with a source of pressure, e.g., a pressurised fluid. For example, the controller may be coupled to the control chamber flow passage 142. In some embodiments, the controller may be configured to route pressure from the upstream portion 102a of the fluid flow passage 102. Therefore, in some embodiments, the same fluid, or fluid at the same pressure, may be supplied to the control chamber 126 of the valve assembly 100. Further, the controller may be further configured to vent the pressurized fluid present inside the control chamber 126 of the valve assembly 100.

In some embodiments, the actuator body 122 further includes a guide shaft 152 configured to guide a movement of the valve member 130. In some embodiments, the second valve member portion 134 is slidably engaged with the guide shaft 152. In some embodiments, the second valve member portion 134 further includes a tubular section 154 at least partially and slidingly receiving the guide shaft 152 therein. In some embodiments, the tubular section 154 may be concentric to the guide shaft 152. The second valve member portion 134 further includes a cap 155 that closes the tubular section 154 at its end.

In some embodiments, the guide shaft 152 may be fixed relative to the valve member 130 and to the second valve member portion 134 since the actuator body 122 is in a fixed position relative to the valve seat 104. Therefore, the guide shaft 152 may guide the tubular section 154 and the second valve member portion 134 as the valve member 130 moves between the first position P1 (shown in FIG. 6) and the second position P2. In other words, translational movement of the valve member 130 (i.e., between the first and second positions P1, P2, in the first and second directions D1, D2) is at least in part defined by the guide shaft 152, which is configured to prevent lateral movement (i.e., in a direction perpendicular to the first and/or second directions D1, D2) of the valve member 130.

FIG. 5B illustrates a partial sectional view of the valve assembly 100 including the outer volume 128. Referring now to FIGS. 5A and 5B, in some embodiments, the valve member 130 further includes an open valve stop 136 that is configured to engage with the actuator body 122 to limit a movement of the valve member 130 in a direction away from the valve seat 104 (i.e., the second direction D2). Thus, the valve member 130 may be able to move in the second direction D2 until the open valve stop 136 engages the actuator body 122. Further, the valve assembly 100 is in a fully open configuration as the open valve stop 136 engages the actuator body 122. In some embodiments, the open valve stop 136 is an annular projection disposed on an internal surface of the valve member 130. In some embodiments, the valve member 130 further includes a closed valve stop 138 configured to sealingly engage with the valve seat 104 in the first position P1 (shown in FIG. 6) of the valve member 130. In some embodiment, the closed valve stop 138 is an annular surface portion disposed on an external surface of the valve member 130.

The valve member 130 further includes at least one orifice 160 extending therethrough. In some embodiments, the valve member 130 includes a first end 156 facing the valve seat 104 and a second end 158 opposite to the first end 156. The at least one orifice 160 is disposed proximal to the second end 158. In some embodiments, the second valve member portion 134 includes the at least one orifice 160. The "at least one orifice 160" is interchangeably referred to hereinafter as the "orifice 160".

The at least one orifice 160 fluidly communicates the control chamber 126 with the outer volume 128. Thus, as the pressure increases inside the control chamber 126 and the valve member 130 translates from the first position P1 (shown in FIG. 6) towards the second direction D2, fluid may flow from the inside of the control chamber 126 to the outer volume 128.

The at least one orifice 160 may extend at least partially in a radial direction with respect to the longitudinal axis X-X' between the control chamber 126 and the outer volume 128. In some embodiments, the at least one orifice 160 may be integrally formed in the second valve member portion 134. In some embodiments, the at least one orifice 160 may be provided in the second valve member portion 134 by any suitable method, for example, drilling.

In some embodiments, a total cross-sectional area of the at least one orifice 160 is less than a total cross-sectional area of the at least one control chamber flow passage 142. Thus, fluid entering through the control chamber flow passage 142 may be able to increase the pressure inside the control chamber 126 and not all fluid entering through the control chamber flow passage 142 shall pass through the orifice 160 to the outer volume 128 as the valve member 130 moves away from the valve seat 104 in the second direction D2. Further, the pressure inside the control chamber 126 may act along with the bias of the bellows 124 to move the valve member 130 away from the valve seat 104 (in the second direction D2), and hence, open the valve assembly 100 even after accounting for leakage through the orifice 160. This may overcome any closing force provided on the upstream portion 102a of the fluid flow passage 102.

In the second position P2 of the valve member 130, the open valve stop 136 sealingly engages with the actuator body 122 to seal the outer volume 128. Thus, the outer volume 128 as defined between the exterior surface 124b of the bellows 124 and the first valve member portion 132 may be transformed into a sealed volume as the open valve stop 136 sealingly engages with the actuator body 122. It should be understood that the outer volume 128 is sealed only when the open valve stop 136 engages the actuator body 122.

In some embodiments, the at least one orifice 160 is configured to at least partially reduce (e.g., through flow of fluid from the control chamber 126 to the outer volume 128) any pressure difference between the control chamber 126 and the outer volume 128 upon sealing engagement between the open valve stop 136 and the actuator body 122. Thus, fluid may flow through from the control chamber 126 to the outer volume 128 through the orifice 160 until the pressure difference between the control chamber 126 and the outer volume 128 is significantly reduced upon sealing engagement between the open valve stop 136 and the actuator body 122.

Reduction in pressure difference between the control chamber 126 and the outer volume 128 may equalize pressures between the control chamber 126 and the outer volume 128, thereby mitigating any unbalanced forces on the bellows 124 towards any particular direction (e.g., causing lateral distortion) that would have negatively impacted a service life of the bellows 124 and the valve assembly 100.

Elimination of wear and tear on the bellows 124 supports reduction in maintenance activities required for the valve assembly 100. Thus, the valve assembly 100 may achieve a "fit and forget" design that does not require overhaul (servicing or replacement) over a life of the engine 10 (shown in FIG. 1) and offers significant benefit to the total life cycle cost of the valve assembly 100 as frequent maintenance activities for the valve assembly 100 (such as removal and replacement, logistics, component tear down, inspection, replacement of worn seals, re-build, re-certification, company overheads, etc.) may be mitigated or avoided.

Referring now to FIG. 6, the valve assembly 100 in shown the closed configuration and valve member 130 is in the first position P1. Accordingly, no fluid is permitted to flow past the actuator assembly 120 as the first valve member portion 132 of the valve assembly 100 engages with the valve seat 104.

In the first position P1 of the valve member 130, the bellows 124 is in the contracted configuration B1, i.e., the bellows 124 has the second dimension (e.g., depth) smaller than the first dimension of the bellows 124 in the expanded configuration B2. The first position P1 of the valve member 130 may be attained by venting (e.g., via the control chamber flow passage 142 and under control of the controller) the control chamber 126 of the actuator assembly 120 such that the pressure inside the control chamber 126 is not sufficient to overcome the pressure outside the actuator assembly 120 at the second valve member portion 134. Therefore, the valve member 130 moves to its first position P1, compressing the bellows 124, seating the closed valve stop 138 against the valve seat 104.

It should be understood from FIGS. 5A and 6 that the valve assembly 100 includes a moveable component (e.g., the valve member 130) and a static component (e.g., the actuator body 122). In some embodiments, the actuator assembly 120 includes a piston. For example, the valve member 130 may be part of a moveable piston. The control chamber 126 may be a chamber of the moveable piston.

It should be understood that the valve assembly 100 provides a dynamic seal (e.g., when the closed valve stop 138 engages the valve seat 104) between two moving components. Accordingly, the closed valve stop 138 and/or the valve member 130 may be considered to be a dynamic seal for the valve assembly 100. The closed valve stop 138 and/or the valve member 130 may therefore permit relative movement between surfaces that require sealing. When the closed valve stop 138 is engaged with the valve seat 104 to block flow of the fluid through the fluid flow passage 102, a seal may therefore be obtained in the valve assembly 100.

As the bellows 124 is biased to the expanded configuration B2 (thereby biasing the valve assembly 100 to the open configuration), no separate opening feature (e.g., a spring) is needed to open the valve assembly 100. Additionally, in some embodiments, the bellows 124 is mechanically connected to the actuator body 122 (the static component) and the valve member 130 (the moveable component), therefore mechanically restrained from rotation.

It should be understood that the bellows 124 may provide at least one of the following functions: to act as a "spring constant" for the valve assembly 100, to define the default state of the valve assembly 100 (to ensure that the valve assembly 100 is open when under no differential pressure), seal the control chamber 126, and rotationally constrain the actuator body 122 and valve member 130 from moving.

Figure 7:
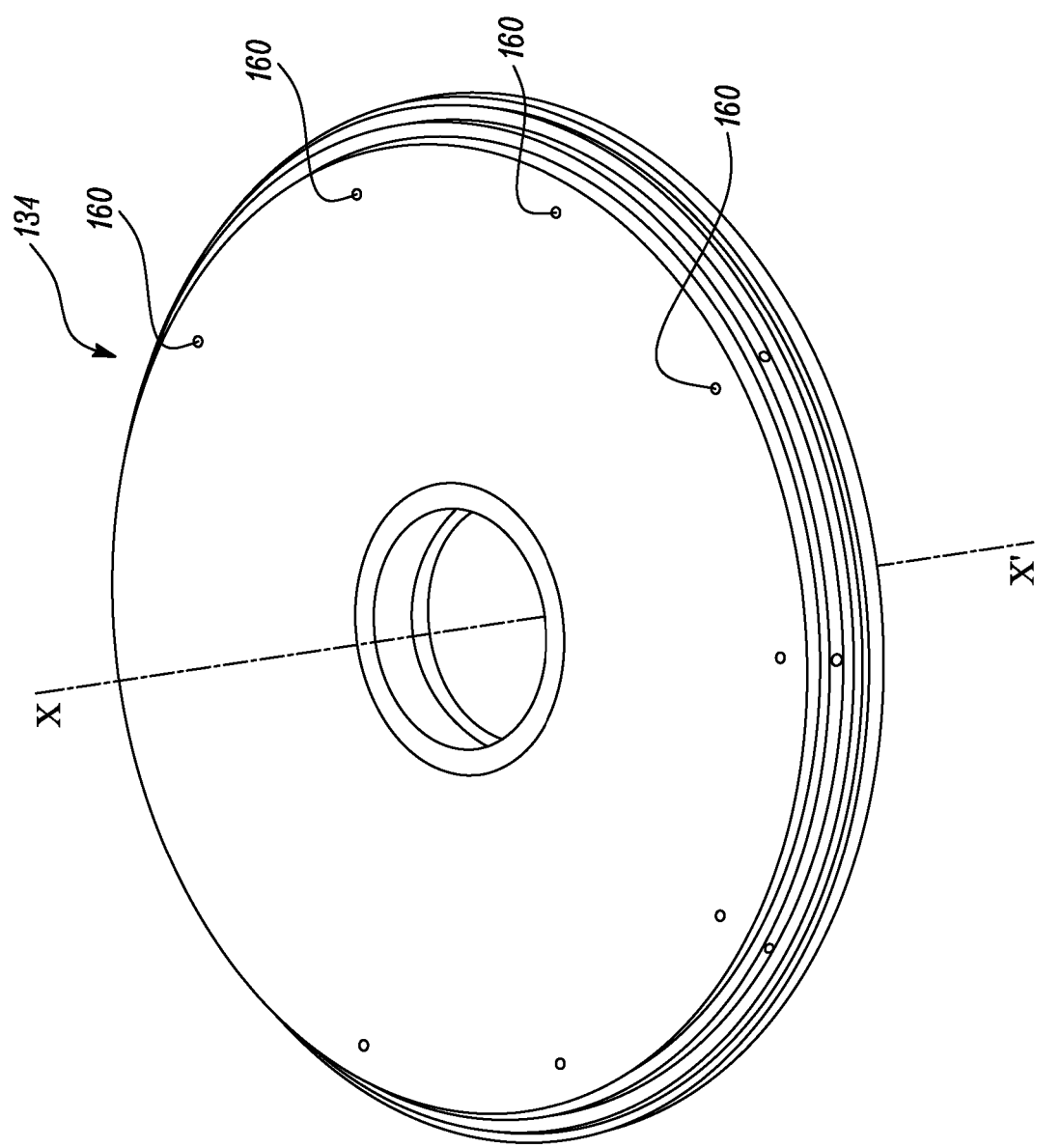
FIG. 7 is a schematic perspective view of a second valve member portion, according to an embodiment of the present disclosure.

FIG. 7 illustrates a schematic perspective view of the second valve member portion 134. In the illustrated embodiment of FIG. 7, the at least one orifice 160 includes a plurality of orifices 160 angularly separated from each other with respect to the longitudinal axis X-X' of the valve assembly 100 (shown in FIGS. 4-6). In some embodiments, the plurality of orifices 160 may be disposed on the second valve member portion 134 at equal angular intervals with respect to the longitudinal axis X-X'. In some embodiments, the at least one orifice 160 may include three orifices 160 spaced apart from each other at 120 degrees with respect to the longitudinal axis X-X'. It should be understood that the plurality of orifices 160 may include any number of orifices angularly spaced apart from each other at regular or irregular intervals with respect to the longitudinal axis X-X'.

Figure 8:
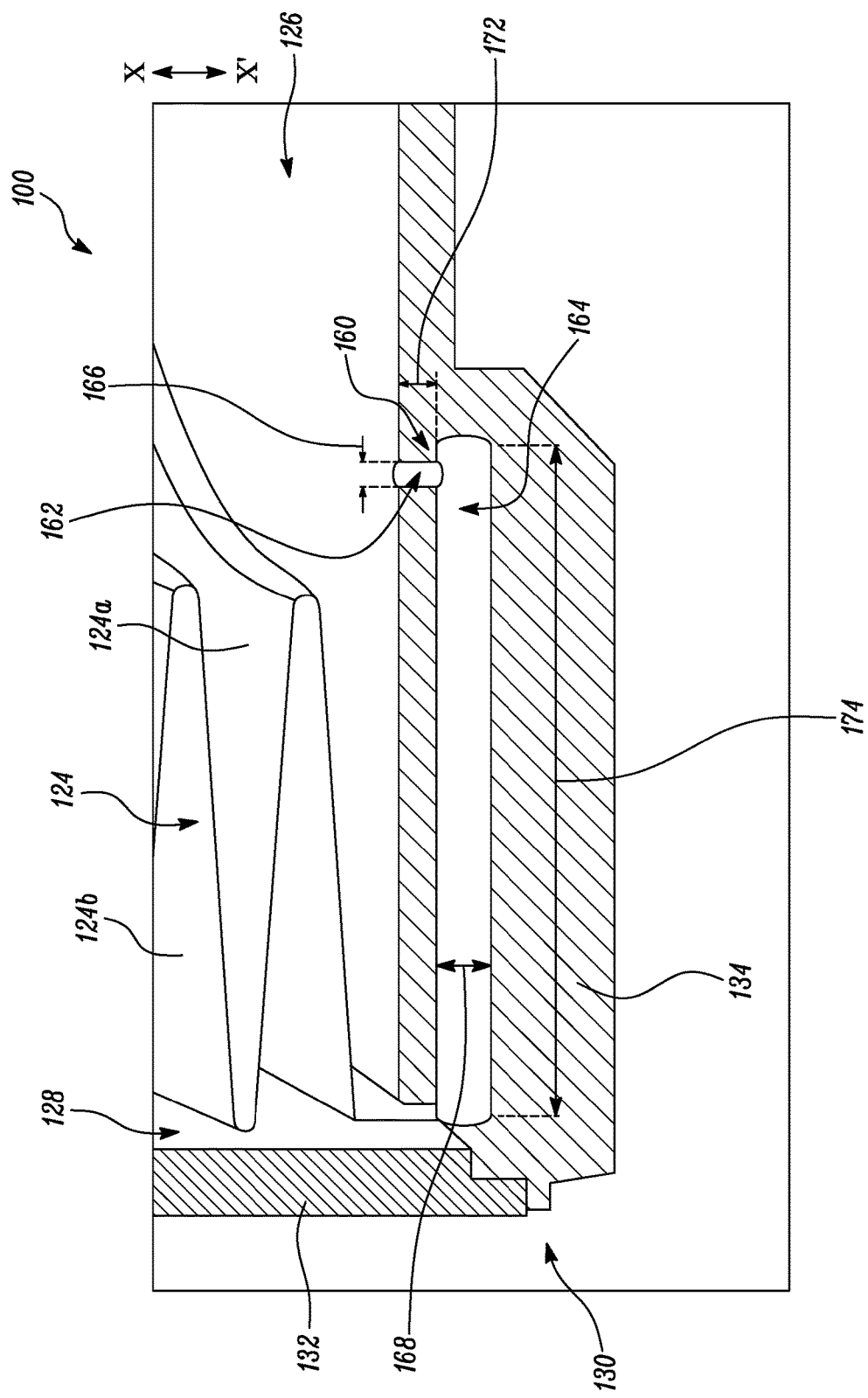
FIG. 8 is a partial schematic sectional view of the valve assembly including at least one orifice, according to an embodiment of the present disclosure.

FIG. 8 illustrates a partial schematic sectional view of the valve assembly 100 including the orifice 160. The orifice 160 fluidly couples the control chamber 126 to the outer volume 128.

In some embodiments, the at least one orifice 160 includes a first orifice portion 162 disposed in fluid communication with the control chamber 126, and a second orifice portion 164 inclined to the first orifice portion 162 and disposed in fluid communication with the outer volume 128. Specifically, the first orifice portion 162 is disposed in direct fluid communication with the control chamber 126, while the second orifice portion 164 is disposed in direct fluid communication with the outer volume 128. In some embodiments, the first orifice portion 162 is disposed in direct fluid communication with the second orifice portion 164 such that fluid from the control chamber 126 may flow through the orifice 160 to the outer volume 128. In some embodiments, the first orifice portion 162 is perpendicular to the second orifice portion 164. However, in some other embodiments, the first orifice portion 162 may be obliquely inclined with respect to the second orifice portion 164. In the illustrated embodiment of FIG. 8, the first orifice portion 162 extends along the longitudinal axis X-X' of the valve assembly 100. Further, the second orifice portion 164 extends radially outwards relative to the longitudinal axis X-X' from the first orifice portion 162 towards the outer volume 128.

In some embodiments, the first orifice portion 162 and/or the second orifice portion 164 may have any suitable cross-sectional shape, such as, for example, circular, oval, elliptical, polygonal, or irregular. In some embodiments, the first orifice portion 162 has a first average width 166 and the second orifice portion 164 has a second average width 168. In some embodiments, the first average width 166 is less than the second average width 168. In some embodiments, the second orifice portion 164 has a larger cross-sectional area than a cross-sectional area of the first orifice portion 162. This may allow metering of fluid flow through the orifice 160. In some embodiments, the second average width 168 may be greater than the first average width 166 by a factor of at least two.

In some embodiments, the first orifice portion 162 has a first length 172 and the second orifice portion 164 has a second length 174. In some embodiments, the second length 174 is greater than the first length 172 by a factor of at least five. In some embodiments, the second length 174 is greater than the first length 172 by a factor of at least four, at least three, or at least two. In some other embodiments, the first length 172 is equal to the second length 174.

It should be understood that the first and second average widths 166, 168 and the first and second lengths 172, 174 of the first and second orifice portions 162, 164, respectively, may be appropriately chosen based on application requirements.

Figure 9:
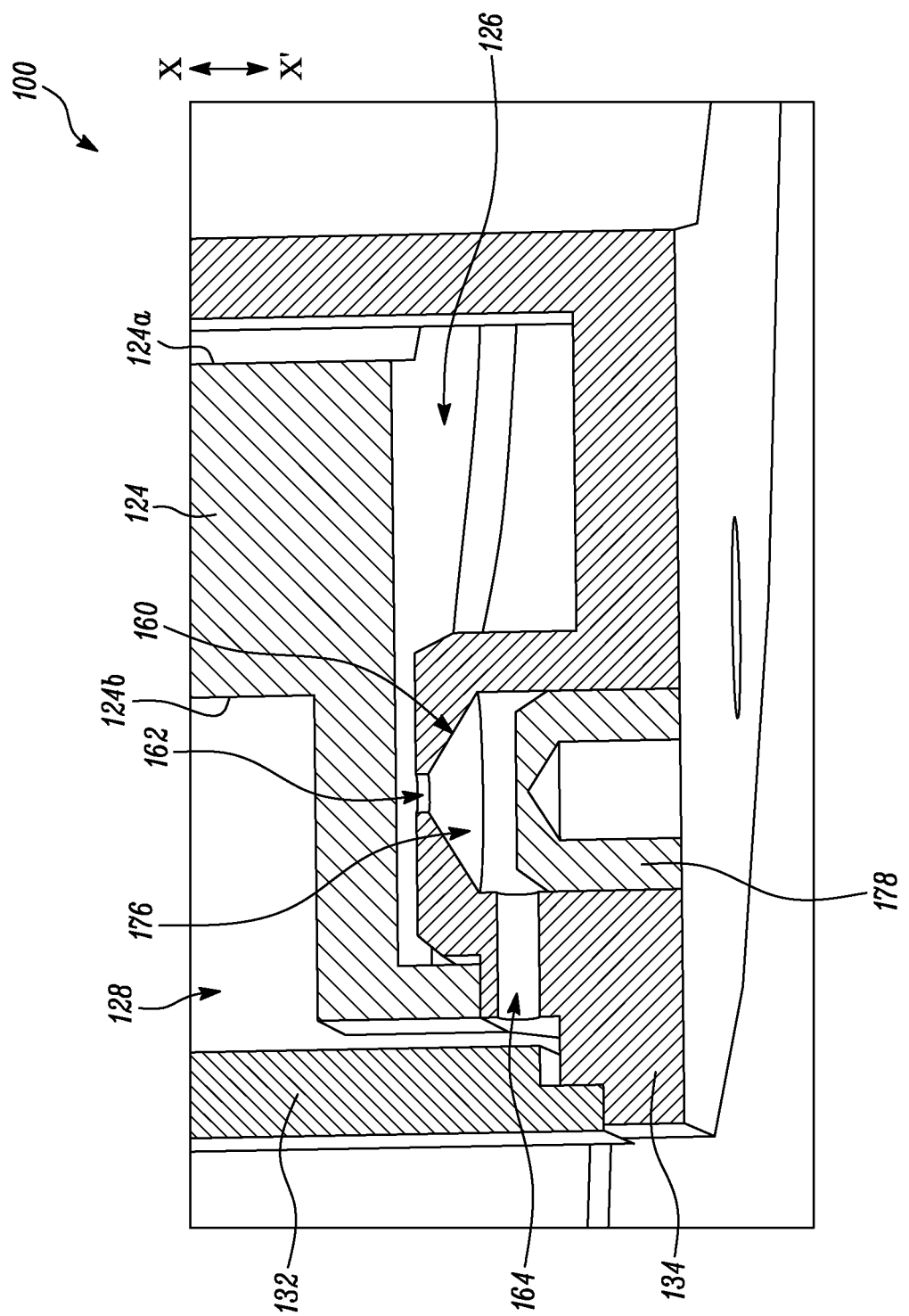
FIG. 9 is a partial schematic sectional view of the valve assembly including the at least one orifice, according to another embodiment of the present disclosure.

FIG. 9 illustrates a partial schematic sectional view of the valve assembly 100 including the orifice 160, according to another embodiment of the present disclosure. The orifice 160 fluidly couples the control chamber 126 to the outer volume 128. Further, in the illustrated embodiment of FIG. 9, the orifice 160 includes the first orifice portion 162 disposed in indirect fluid communication with the second orifice portion 164.

As shown in FIG. 9, the at least one orifice 160 further includes an adjustable orifice area portion 176 fluidly disposed between the first orifice portion 162 and the second orifice portion 164. In some embodiments, the adjustable orifice area portion 176 fluidly couples the first orifice portion 162 to the second orifice portion 164 such that fluid from the control chamber 126 may flow to the outer volume 128 through the adjustable orifice area portion 176.

The actuator assembly 120 (shown in FIGS. 4B-6) further includes an adjustable plug 178 movably coupled to the valve member 130 adjacent to the adjustable orifice area portion 176. In some embodiments, the adjustable plug 178 may be in the form of a screw capable of being screwed to the valve member 130 adjacent to the adjustable orifice area portion 176. Therefore, the adjustable plug 178 may be threadingly adjusted relative to the valve member 130. In some embodiments, the adjustable plug 178 may be coupled to the valve member 130 through an interference fit. In such cases, the adjustable plug 178 may be adjusted with respect to the valve member 130 using an appropriate tool. In some embodiments, the adjustable plug 178 is configured to selectively adjust a cross sectional area of the adjustable orifice area portion 176. Thus, flow of the fluid from the control chamber 126 to the outer volume 128 may be adjusted based on a change in the cross sectional area of the adjustable orifice area portion 176 by adjusting the adjustable plug 178.

In the illustrated embodiment of FIG. 9, the cross sectional area of the adjustable orifice area portion 176 tapers from the second orifice portion 164 towards the first orifice portion 162. However, the cross sectional area of the adjustable orifice area portion 176 may have any shape as per application requirements.

The valve assembly 100 described above may be used in a bleed-air system or subsystem of the engine 10. In some embodiments, the valve assembly 100 may be used in systems, such as 2-state subsystems, flow modulating subsystems, pressure regulating sub-systems, and non-return subsystems. In some embodiments, the valve assembly 100 may be used in conjunction with a compressor, operability bleed, starting bleed, anti-icing, pressure regulating, turbine case cooling, bleed air non-return flow systems, etc. The at least one orifice 160 may be suitable for a variety of fluids including air, oil, Skydrol™ aviation hydraulic fluid, and aviation fuel (e.g., all compressible or incompressible fluids).

Referring to FIGS. 4A-9, the at least one orifice 160 may allow movement of a fluid from the control chamber 126 to the outer volume 128, and therefore, allow a pressure inside the control chamber 126 to be balanced with a pressure outside the control chamber 126 (i.e., the outer volume 128) when the valve member 130 is in the second position P2 and away from the valve seat 104. This may significantly reduce or eliminate any unbalanced forces on the valve member 130, and therefore, avoid lateral distortion of the valve member 130. Further, this pressure balance may increase a cyclic life (or a service life) of the valve member 130 across the operational cycles of the valve assembly. Additionally, this may further decrease a total life cycle cost of the valve assembly 100.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A valve assembly comprising:
 a fluid flow passage to permit a flow of a fluid through the valve assembly;
 a valve seat; and
 an actuator assembly comprising:
 an actuator body in a fixed position relative to the valve seat;
 a valve member moveable relative to the valve seat between a first position in which the valve member is at least partially engaged with the valve seat to at least partially block the fluid flow passage, and a second position in which the valve member is remote from the valve seat, wherein the valve member is moveable relative to the actuator body and extends around the actuator body such that the actuator body is disposed within the valve member, the valve member comprising at least one orifice extending therethrough; and
 a bellows received within the valve member, and attached to the valve member and to the actuator body, the bellows comprising an interior surface and an exterior surface opposite to the interior surface;
 wherein the interior surface of the bellows, the actuator body, and the valve member define a control chamber therebetween, wherein the exterior surface of the bellows and the valve member define an outer volume therebetween such that the outer volume is around the control chamber, and wherein the at least one orifice fluidly communicates the control chamber with the outer volume.

2. The valve assembly of claim 1, wherein the valve member comprises a first valve member portion proximate the valve seat and a second valve member portion remote from the valve seat, wherein the actuator body comprises a first actuator side and a second actuator side opposite to the first actuator side, wherein the first actuator side faces the first valve member portion and the second actuator side faces the second valve member portion, and wherein the bellows is attached to the second actuator side of the actuator body and to the second valve member portion, the bellows thereby being disposed between the actuator body and the second valve member portion.

3. The valve assembly of claim 2, wherein the first valve member portion is around the actuator body and at least partially engages the valve seat in the first position of the valve member.

4. The valve assembly of claim 3, wherein the interior surface of the bellows, the actuator body, and the second valve member portion define the control chamber therebetween.

5. The valve assembly of claim 4, wherein the exterior surface of the bellows and the first valve member portion define the outer volume therebetween.

6. The valve assembly of claim 5, wherein the second valve member portion comprises the at least one orifice.

7. The valve assembly of claim 6, wherein the valve member is configured to move toward its first position when a pressure outside of the actuator assembly at the second valve member portion is greater than a pressure inside of the control chamber.

8. The valve assembly of claim 7, wherein the valve member is configured to move toward its second position when the pressure outside of the actuator assembly at the second valve member portion is less than or equal to the pressure inside of the control chamber.

9. The valve assembly of claim 8, wherein the at least one orifice comprises a first orifice portion disposed in fluid communication with the control chamber, and a second orifice portion inclined to the first orifice portion and disposed in fluid communication with the outer volume.

10. The valve assembly of claim 9, wherein the first orifice portion has a first length and average width and the second orifice portion has a second length and average width, and wherein the second length is greater than the first length by a factor of at least five whilst the first average width is less than the second average width.

11. The valve assembly of claim 10, wherein the at least one orifice further comprises an adjustable orifice area portion fluidly disposed between the first orifice portion and the second orifice portion, wherein the actuator assembly further comprises an adjustable plug movably coupled to the valve member adjacent to the adjustable orifice area portion, and wherein the adjustable plug is configured to selectively adjust a cross sectional area of the adjustable orifice area portion.

12. The valve assembly of claim 11, wherein the at least one orifice comprises a plurality of orifices angularly separated from each other with respect to a longitudinal axis (X-X') of the valve assembly.

13. The valve assembly of claim 12, wherein the valve member further comprises an open valve stop that is configured to engage with the actuator body to limit movement of the valve member in a direction away from the valve seat.

14. The valve assembly of claim 13, wherein, in the second position of the valve member, the open valve stop sealingly engages with the actuator body to seal the outer volume, and wherein the at least one orifice is configured to at least partially reduce any pressure difference between the control chamber and the outer volume upon sealing engagement between the open valve stop and the actuator body.

15. The valve assembly of claim 14, wherein the valve member further comprises a closed valve stop configured to sealingly engage with the valve seat in the first position of the valve member.

16. The valve assembly of claim 15, wherein the bellows is moveable between an expanded configuration in which the bellows has a first dimension and a contracted configuration in which the bellows has a second dimension, the second dimension being smaller than the first dimension, and wherein, when moving to its expanded configuration, the bellows is configured to move the valve member to its second position and, when moving to its contracted configuration, the bellows is configured to move the valve member to its first position.

17. The valve assembly of claim 16, further comprising at least one control chamber flow passage fluidly separate from the fluid flow passage and disposed in fluid communication with the control chamber, wherein the at least one control chamber flow passage is configured to permit a flow of a fluid to the control chamber.

18. The valve assembly of claim 17, wherein a total cross-sectional area of the at least one orifice is less than a total cross-sectional area of the at least one control chamber flow passage.

19. The valve assembly of claim 18, further comprising a housing member comprising the fluid flow passage, the valve seat, and the at least one control chamber flow passage, wherein the housing member further comprises at least one extending portion extending with respect to the valve seat and fixedly coupled to the actuator body, and wherein the at least one extending portion at least partially defines the at least one control chamber flow passage.

20. The valve assembly of claim 19, wherein the actuator body further comprises at least one actuator flow passage fluidly communicating the at least one control chamber flow passage with the control chamber.

* * * * *